United States Patent [19]

Savit

[11] Patent Number: 4,547,869
[45] Date of Patent: Oct. 15, 1985

[54] MARINE SEISMIC SENSOR

[75] Inventor: Carl H. Savit, Houston, Tex.

[73] Assignee: Western Geophysical Company of America, Houston, Tex.

[21] Appl. No.: 482,007

[22] Filed: Apr. 4, 1983

[51] Int. Cl.[4] .......................... G01V 1/16; G01V 1/38
[52] U.S. Cl. .................................. 367/149; 367/153; 367/130; 73/653; 350/96.23
[58] Field of Search ............... 367/141, 149, 154, 153, 367/20, 21, 119, 129, 130, 140; 181/110, 112; 350/96.23; 73/653, 655; 340/566

[56] References Cited

U.S. PATENT DOCUMENTS

| | | | |
|---|---|---|---|
| 3,952,281 | 4/1976 | Parrack | 181/112 |
| 4,078,223 | 3/1978 | Strange | 181/112 |
| 4,115,753 | 9/1978 | Shajenko | 367/154 |
| 4,162,397 | 7/1979 | Bucaro et al. | 367/140 |
| 4,313,192 | 1/1982 | Nelson et al. | 367/130 |
| 4,320,475 | 3/1982 | Le Clerc et al. | 367/149 |

OTHER PUBLICATIONS

Savit et al., "A 500-Channel Streamer System", 9th Annual OTC, May 2-5/77.

Primary Examiner—Nelson Moskowitz
Assistant Examiner—Ian J. Lobo
Attorney, Agent, or Firm—William A. Knox

[57] ABSTRACT

A hydrophone streamer that includes several arrays of optical fiber pressure sensors. Each array consists of at least three sensors symmetrically disposed around the inside of the streamer skin to form a vertically-disposed array. Each sensor modulates a coherent light beam in accordance with the instantaneous ambient water pressure. The output signals of the sensors include an AC component due to seismic waves and a DC component due to hydrostatic pressure difference between the sensors of an array. Means are provided to resolve the AC and DC components to determine the arrival direction of the received seismic waves.

6 Claims, 4 Drawing Figures

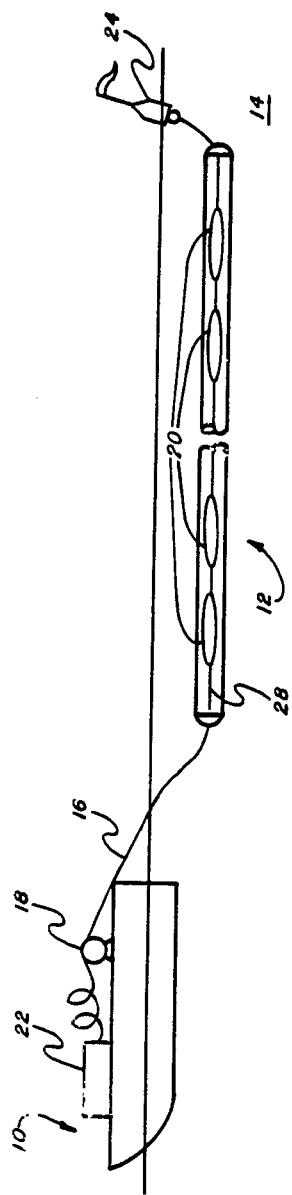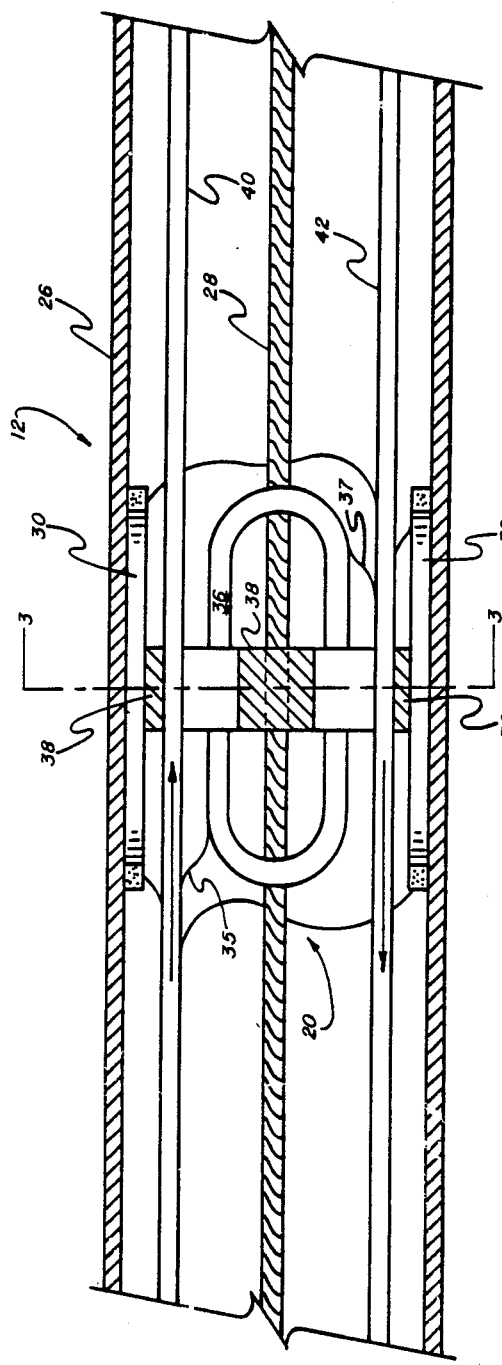

MARINE SEISMIC SENSOR

BACKGROUND OF THE INVENTION

1. Field of the Invention

This invention relates to the use of optical-fiber pressure sensors to determine the direction of propagation of seismic pressure waves in a body of water.

2. Discussion of the Prior Art

In seismic exploration at sea, a plurality of pressure sensors are encased in a long tubular plastic streamer which may extend for one or two miles. A ship tows the streamer through the water at a desired depth. The earth layers beneath the sea are insonified by suitable means. The sonic waves are reflected from the earth layers below, to return to the surface of the water in the form of pressure waves. The pressure waves are detected by the pressure sensors and are converted to electrical signals. The electrical signals are transmitted to the towing ship via transmission lines that are contained within the streamer.

The reflected sound waves not only return directly to the pressure sensors where they are first detected, but those same reflected sound waves are reflected a second time from the water surface and back to the pressure sensors. The surface-reflected sound waves of course, are delayed by an amount of time proportional to twice the depth of the pressure sensors and appear as secondary or "ghost" signals. Because the direct and surface-reflected sound waves arrive close together in time—a few milliseconds -they tend to interfere with one another. It is desirable therefore to determine the direction of propagation of the sound waves so that the upward- and downward-propagating waves may be more readily sorted out during data processing.

It is possible to position two individual sensors in a fixed vertical array. It would of course then be easy to identify the direction of propagation of the sonic waves from the measured difference in time that a particular wavelet arrives at the respective sensors that make up the vertical array. See for example, U.S. Pat. No. 3,952,281. That method however requires two separate hydrophone cables. Since such cables cost about a half-million dollars each, that course of action would be decidedly uneconomical.

Assuming that sufficiently compact sensors could be obtained, it would be possible to mount a substantially vertical array of sensors inside the same streamer, a few inches apart. But a seismic streamer cable twists and turns as it is towed through the water. If a substantially vertical sensor array were to be mounted inside the streamer, there would be no way to determine which one of the sensors in the array is "up", assuming conventional detectors are used. It is also important to be able to identify unwanted waves travelling horizontally from scatterers within or near the bottom of the water layer.

As is well known, a water-pressure gradient exists between two points spaced vertically apart in a body of water. If then, there were some way that the hydrostatic pressure gradient between two vertically-disposed detectors could be measured, the uppermost detector of an array could be identified.

Conventional marine detectors or hydrophones use piezo-electric ceramic wafers as the active element. The wafers are generally mounted to operate in the bender mode. Transient pressure changes due to acoustic waves flex the wafers to generate an AC charge current. The wafers are also sensitive to hydrostatic pressure. But the DC charge due to hydrostatic pressure leaks off rapidly through associated circuitry. Therefore a differential DC component due to a hydrostatic pressure difference of the detector signal cannot be detected.

It is an object of this invention to provide a plurality of arrays of pressure sensors in an inexpensive streamer that is capable of detecting AC transient pressure signals due to seismic waves and to identify their direction of arrival with reference to the vertical whose direction is sensed by measuring the DC bias due to the vertical hydrostatic pressure gradient.

SUMMARY OF THE INVENTION

In accordance with this invention, a plurality of optical-fiber, sensor arrays are mounted interiorly of a seismic streamer at a like plurality of sensor stations distributed at intervals along the streamer. Each sensor array consists of a set of at least three and preferably four coils of monomodal optical fiber that act as pressure sensors. If four coils are used, the four sensor-coils are mounted ninety degrees apart around the inner surface of the streamer skin. A laser or LED launches a coherent beam of monochromatic light into each set of sensor coils via an input transmission line. Transient and static pressures at the sensor coils modulate the light beam. The modulated output light beam from each sensor coil of a set is delivered to a multiple-input photo detector where the beam from each individual sensor coil is separately combined interferometrically with a reference beam. The photo-detector converts the resulting optical beat signals to AC electrical signals representative of the polarity and amplitude of transient seismic signals impinging upon the sensor coils.

In accordance with another aspect of this invention, separate modulated output light beams are combined interferometrically with each other at a photo-detector which converts the phase difference between the light beams to a DC electrical signal having a magnitude representative of the DC bias due to the hydrostatic pressure gradient between the sensor coils. The AC seismic signals and the DC bias signals are transmitted to a data processor where the direction of propagation of incoming seismic waves may be resolved.

In another aspect of this invention, the laser, photo-detectors, data processor and other optical and electronic circuitry are mounted aboard a towing ship. The input and modulated output light beams are transmitted to the sensor coils through optical-fiber bundles.

In yet another aspect of this invention, each set of sensor-coils is provided with a separate laser or LED, photo detectors, and a beam splitter to provide a reference beam, all mounted together in a single module at the sensor stations. The modulated light beams are resolved as to the AC and DC signal components which are converted to electrical signals. The electrical signals are transmitted to the data processor by wire line.

BRIEF DESCRIPTION OF THE DRAWINGS

For a better understanding of this invention, reference may be made to the appended detailed description and the drawings wherein:

FIG. 1 shows a boat towing through the water a streamer containing a plurality of optical-fiber sensor coils at corresponding sensor stations;

FIG. 2 is a longitudinal cross section of the streamer at a typical sensor station;

DETAILED DESCRIPTION OF THE PREFERRED EMBODIMENT

Figure 3:
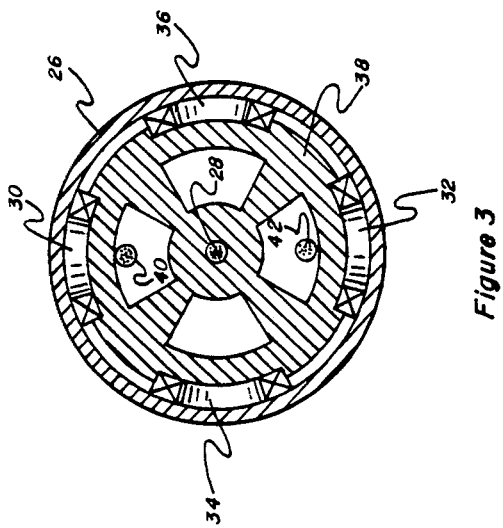
FIG. 3 is a cross section of the streamer along line 3—3.

Referring now to FIG. 1, there is shown a ship 10 towing a seismic streamer 12 through a body of water 14. Streamer 12 is towed by an armored lead-in 16 which includes stress members, armoring and it may include one or more optical fiber bundles. When not in use, lead-in 16 and streamer 12 are stored on a reel 18 at the stern of boat 10. Streamer 12 contains several sets 20 of optical-fiber sensor coils, one set per sensor station. As will be seen later, each set 20, includes three but preferably four such sensor coils. An optical equipment package 22 such as a laser, photo detectors, optical couplers and data processing equipment is mounted aboard ship 10. Equipment package 22 will be described at length later. A tail buoy or drogue 24 marks the end of the streamer 12. One known system, which however employs only one sensor per sensor station is shown in U.S. Pat. No. 4,115,753.

Streamer 12 consists essentially of a long tubular plastic skin made of polyvinyl chloride, polyurethane, or the like, about three inches in diameter, closed at both ends. A complete streamer may be several thousand feet long but, for convenience in handling, it may be divided into a number of detachable sections. The streamer is filled with a substantially incompressible fluid transparent to seismic waves for coupling external pressures to the internally-mounted sensors. A stress member 28, usually a stainless steel cable, is threaded through the entire streamer to prevent rupture due to towing stress.

Referring to FIG. 2 which is a longitudinal cross section of a portion of the cable at a sensor station, and FIG. 3 which is a cross section at 3—3 of FIG. 2, a sensor unit 20 consists of a set of at least three and preferably four optical-fiber sensor coils 30, 32, 34, 36 having an elongate configuration that are mounted inside skin 26 of streamer 12 parallel to the longitudinal axis. For sake of example, let it be assumed that there are four such coils. There are thus two pairs of sensor coils such as 30 and 32, 34 and 36. The members of each pair are mounted diametrically opposite to one another at 90° intervals, parallel to and as far away from the longitudinal axis of the streamer as practicable. Preferably the sensor coils are held in place by a plastic spider such as 38. Since the longitudinal axis of the streamer, when under tow, is substantially horizontal, the set of sensor coils forms a two-dimensional array having a vertical extent comparable to the inner diameter of the tube 26.

The sensor coils are fashioned from many turns of a monomodal glass fiber, having a low light loss per unit of length. The dimensions of the coil and the number of turns depend upon the total length of optical fiber required.

It is well known that when an optical fiber is subjected to a compression, the index of refraction and/or the elongation changes. The phase shift between a light beam transmitted through a reference fiber and a beam transmitted through an active fiber subjected to compression is a function of the fiber length and the incremental change in the index of refraction and/or elongation or both. See for example, U.S. Pat. No. 4,320,475.

For a practical pressure sensor, a fiber length of about 100 meters is required for the active fiber. For an elongated fiber coil loop about two meters long and two or three centimeters wide, about 25 turns would be necessary. It is necessary for the sensor coils to be mounted so that flexing or movement of the streamer skin will not distort the shape of the coils. Such distortion would of course introduce spurious signals to the system.

Two optical-fiber bundles 40 and 42 are threaded through the streamer and the respective spiders that support the sensor coils at each sensor station. Bundle 40 is the outbound transmission link through which is launched an input light beam from a transmitting laser (not shown in FIG. 2), to each sensor coil. Bundle 40 may be a single fiber with provision for coupling its transmitted light to each sensor coil or it may consist of a bundle of single fibers, one fiber being assigned to each sensor coil. In effect the coils have an essentially common light-beam input. For example, coil 36 has an input fiber lead 35 and an output fiber lead 37. The other coils have similar input and output leads. Because of the small size and light weight of the fibers, several hundred fibers can be packaged into a single bundle without becoming unduly bulky.

Fiber bundle 42 is the return transmission link for the sensor-coil output light beams. There is one output fiber for every sensor-coil. Therefore, four output fibers are necessary to service each sensor station. The free end of fiber bundle 42 that exits the streamer and lead-in at the ship, is coupled to optical processing circuitry now to be described.

Figure 4:
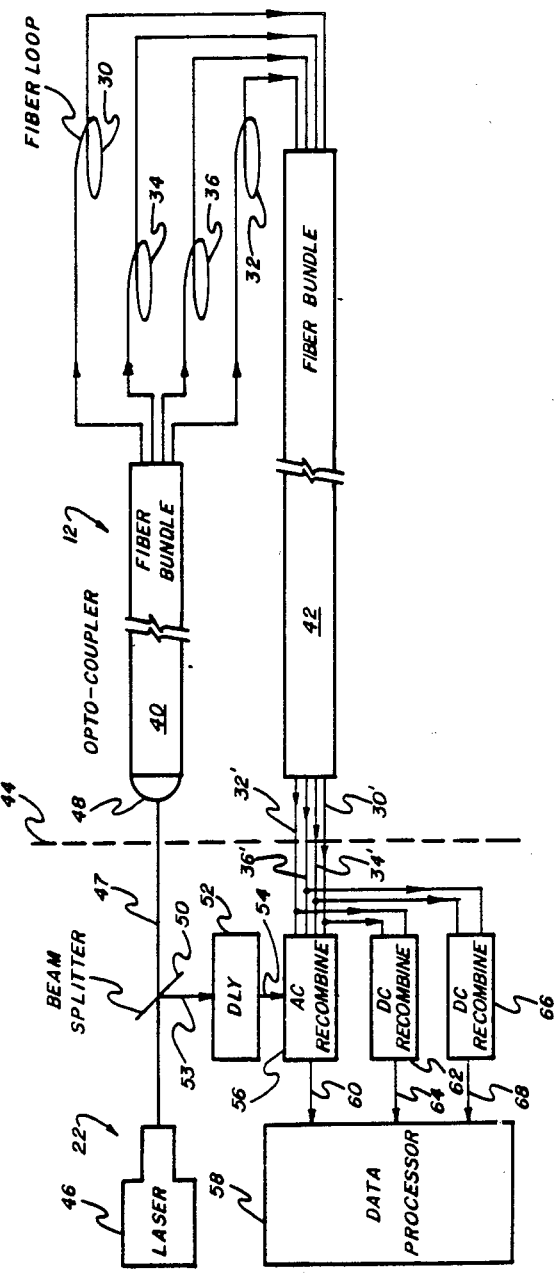
FIG. 4 illustrates schematically, the optical circuitry.

The preferred method of operation of this invention may be gleaned from FIG. 4 which schematically illustrates the optical processing circuitry. In FIG. 4, all components to the left of dashed line 44 may be mounted on ship 10 as part of the processing package 22. Components to the right of dashed line 44 are made a part of streamer 12.

A laser or LED 46, operating preferably in the near infra-red portion of the spectrum launches a coherent light beam 47 into an optical coupler 48 that couples the light beam into the fiber or fibers that make up fiber bundle 40. The optical coupler 48 acts as an essentially common input to the fiber bundle. The light is transmitted to the optical-fiber sensor coils where the light beams are modulated at the frequency and amplitude of the transient seismic pressure waves and by the ambient hydrostatic pressure. The modulated light beams return from the sensor coils, through fiber bundle 42, to processing unit 22. In FIG. 4, only one typical sensor station is shown for simplicity, but it should be understood that fiber bundles 40 and 42 may be extended to service additional sensor stations.

In optical equipment package 22, a beam splitter 50 directs a part 53 of the laser beam 47 into a suitable optical delay module 52 whose output becomes a reference beam 54. Optical delay module 52 retards beam 53 to match the length of the optical path between beam splitter 50 and the sensor coils 30, 32, 34, 36 of any given sensor station. A different delay module is associated with each of the plurality of sensor stations to compensate for the differing optical path lengths.

The modulated light beams return from sensor coils 30, 32, 34, 36 through corresponding optical fibers 30', 32', 34', 36'. The beams are individually combined interferometrically with reference beam 54 by suitable photo-detectors, of any desired type, in multiple-input combiner module 56. The resulting beat frequency is converted to an AC electrical wave train representative of the amplitude levels and frequency of the transient pressure variations due to seismic waves. The electrical signals from the four sensors may be multiplexed into data processor 58 over line 60.

The DC bias, or phase shift due to a water-pressure gradient, between the light beams in a first pair of diametrically opposite sensor coils such as 30 and 32 is measured by interferometrically combining the two output light beams in a photo-detector 62. The phase shift between the two beams is converted to a first DC electric bias signal having a magnitude that is proportional to the hydrostatic water-pressure gradient and which is delivered to data processor 58 over line 64. Similarly the DC bias or phase shift between the light outputs of the second pair of coils, 34 and 36, is measured by photo detector 66. The resulting electrical output is transmitted to data processor 58 over line 68 as a second DC bias signal. From the magnitude and polarity of the first and second bias signals, the physical orientation of the sensor coils, relative to a vertical plane, can be resolved by well known mathematical algorithms. In data processor 58, since we know now the physical orientation of the sensor coils in the vertical plane, the directions of propagation of the respective seismic pressure waves can be resolved by measuring the arrival-time differences of a seismic wavelet at the respective sensor coils of the array.

In the above discussion, I have disclosed a means for resolving the magnitude and direction, within a vertical plane perpendicular to the axis of the cable, of seismic waves propagating through a fluid medium such as water. The direction of propagation in three-dimensional space can of course be determined by measuring the time difference between the arrival times of the same seismic wavelet at two or more selected consecutive sensor stations along the cable by means well known to the art. The longitudinal time differences may be combined with the vertical time differences by simple vector additional to resolve the direction of propagation in three axes.

I have described my invention in terms of a specific configuration. However, those skilled in the art may consider other equally effective arrangements without departing from the scope of the appended claims. For example, each of the individual sensor arrays could be provided with its own laser, beam splitter, photo-detectors etc., all of which could be included in individual modules mounted in the streamer at each sensor station. The electrical analogs of the measured phase shifts of the modulated and reference light beams would be transmitted to data processor 58, aboard ship 10, by wire line.

I claim as my invention:

1. An apparatus for resolving the magnitude and direction, in a vertical plane, of seismic waves propagating in a fluid medium, comprising:
    means for launching a coherent beam of monochromatic light;
    a sensor array disposed substantially in a vertical plane composed of a set of at least three active optical-fiber pressure sensors for receiving and modulating said coherent beam in proportion to the pressure in said fluid medium to provide modulated beams, said sensors having an essentially common light-beam input and separate light-beam outputs;
    means for receiving said modulated beams from said separate light-beam outputs and for separately combining interferometrically each said modulated light beam with a reference light beam to derive AC signal components representative of transient pressure variations due to seismic waves in said fluid medium;
    means for combining interferometrically said separate modulated light beams with each other to derive DC signal components representative of the hydrostatic pressure differences between the sensors of the array; and
    means for resolving the direction and magnitude of signal propagation by vectorially combining said AC and DC signal components.

2. The apparatus as defined in claim 1, further comprising:
    an elongated streamer closed at both ends and having a tubular skin, for containing said vertical array of sensor coils therewithin; and
    a volume of fluid contained within said streamer for coupling said sensors to fluid pressures that are external of streamer.

3. The apparatus as defined in claim 2, further including:
    a plurality of sets of sensor arrays distributed along the length of said elongated streamer at desired sensor stations.

4. The apparatus as defined by claim 2 comprising:
    means for supporting said fiber-optic sensors adjacent the inner surface of said tubular skin, said sensors having an elongate configuration that is parallel to the longitudinal axis of said streamer.

5. A method for resolving the direction of seismic wave propagation in a water medium, comprising the steps of:
    disposing a plurality of sets of active optical-fiber sensors at desired intervals within and along a substantially horizontally disposed streamer for receiving and modulating a coherent, monochromatic light beam thereby to provide a plurality of modulated light beams, each said set including at least three sensors arrayed in a substantially vertical plane;
    deriving AC signal components representative of transient pressure variations in said water medium due to seismic waves impinging on each said sensor by separately combining interferometrically said plurality of modulated light beams with a reference light beam;
    for each set of sensors, combining interferometrically the plurality of modulated light beams with each other to derive DC signal levels representative of the magnitude of the relative hydrostatic pressure differences;
    measuring the horizontal and vertical arrival-time differences of said transient pressure variations with respect to selected horizontally and vertically disposed sensors; and
    resolving the direction of propagation of seismic waves from said measured time delays.

6. A method for processing seismic signals comprising:
    towing through a body of water a fluid-filled tube having a longitudinal axis, and transparent to seismic waves;
    disposing a plurality of optical-fiber pressure sensor arrays within and along the longitudinal axis of said tube, each array consisting of at least three active optical-fiber pressure-sensing coils, said coils of each said array being disposed in a plane perpendicular to said longitudinal axis in said tube and distributed substantially uniformly therearound;

detecting seismic waves with said optical-fiber pressure-sensing coils to generate output signals;

separating the AC and DC signal components of said output signals; and vectorially resolving said AC and DC signal components to determine the direction of arrival of said seismic waves.

* * * * *